(12) United States Patent
Ikarashi et al.

(10) Patent No.: US 11,929,666 B2
(45) Date of Patent: Mar. 12, 2024

(54) GATE DRIVE CIRCUIT AND POWER CONVERSION DEVICE

(71) Applicant: Mitsubishi Electric Corporation, Tokyo (JP)

(72) Inventors: Hiroshi Ikarashi, Tokyo (JP); Hideyasu Machii, Tokyo (JP); Naoki Takigawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 166 days.

(21) Appl. No.: 17/767,199

(22) PCT Filed: Nov. 10, 2020

(86) PCT No.: PCT/JP2020/041926
§ 371 (c)(1),
(2) Date: Apr. 7, 2022

(87) PCT Pub. No.: WO2021/111823
PCT Pub. Date: Jun. 10, 2021

(65) Prior Publication Data
US 2022/0376604 A1    Nov. 24, 2022

(30) Foreign Application Priority Data

Dec. 3, 2019   (JP) .................. 2019-218475

(51) Int. Cl.
*H02M 1/08* (2006.01)
*H02M 1/088* (2006.01)
*H02M 3/335* (2006.01)

(52) U.S. Cl.
CPC ....... *H02M 1/088* (2013.01); *H02M 3/33523* (2013.01)

(58) Field of Classification Search
CPC ............ H02M 1/088; H02M 3/33523; H02M 3/33573; H02M 7/5387; H02M 1/32
(Continued)

(56) References Cited

U.S. PATENT DOCUMENTS 7,638,904 B2 * 12/2009 Shoji ................. H02M 3/33584
                                                        307/154
9,948,194 B2 *  4/2018 Higaki .................... H02J 7/342
(Continued)

FOREIGN PATENT DOCUMENTS

JP      S58182920 A    10/1983
JP      S6211916 A      1/1987
(Continued)

OTHER PUBLICATIONS

International Search Report (PCT/ISA/210) with translation and Written Opinion (PCT/ISA/237) dated Jan. 12, 2021, by the Japan Patent Office as the International Searching Authority for International Application No. PCT/JP2020/041926.

*Primary Examiner* — Ryan Jager
(74) *Attorney, Agent, or Firm* — BUCHANAN INGERSOLL & ROONEY PC

(57) ABSTRACT

A first drive circuit is connected to a first end of a primary winding of a pulse transformer. A second drive circuit is connected to a second end of the primary winding of the pulse transformer. A voltage clamp unit clamps a voltage of a semiconductor element at a specified voltage when a voltage output from a secondary winding of the pulse transformer is negative. A current detection circuit detects current flowing through the semiconductor element and outputs a detection signal. A control circuit controls the first drive circuit and the second drive circuit based on the detection signal. A current limiting circuit imposes a limit on
(Continued)

current flowing through the primary winding of the pulse transformer based on the detection signal.

17 Claims, 8 Drawing Sheets

(58) Field of Classification Search
USPC .......................................................... 315/291
See application file for complete search history.

(56) References Cited

U.S. PATENT DOCUMENTS

| 10,554,137 | B2* | 2/2020 | Higaki ............... H02M 3/33546 |
| 11,063,523 | B2* | 7/2021 | Hu ........................... H02M 1/15 |
| 2006/0139823 | A1* | 6/2006 | Shoji ...................... H02M 1/34 |
| | | | 361/56 |
| 2007/0218595 | A1* | 9/2007 | Yoshimura .............. H01F 19/08 |
| | | | 438/138 |
| 2012/0206171 | A1* | 8/2012 | Kimura ................ H03K 17/691 |
| | | | 327/109 |
| 2022/0376604 | A1* | 11/2022 | Ikarashi ............ H02M 3/33573 |

FOREIGN PATENT DOCUMENTS

| JP | 2007252109 A | 9/2007 |
| JP | 2012170244 A | 9/2012 |

* cited by examiner

GATE DRIVE CIRCUIT AND POWER CONVERSION DEVICE

TECHNICAL FIELD

The present disclosure relates to a gate drive circuit and a power conversion device.

BACKGROUND ART

As an example of a drive system of a gate drive circuit that drives, at a high speed, a semiconductor element such as an IGBT or a MOSFET used for a main circuit through which a large current flows in a power converter, a system using a pulse transformer as disclosed in PTL 1 is known.

A gate drive circuit using the pulse transformer disclosed in PTL 1 sets a MOSFET used for the main circuit to an OFF state by bringing an upstream MOSFET connected to a secondary side of the pulse transformer into conduction when a drain current flowing through the upstream MOSFET exceeds a threshold. This protects the main circuit against short circuits.

In an isolated gate drive circuit using the pulse transformer disclosed in PTL 1, when a positive drive signal is applied to a primary winding of the pulse transformer, an isolated positive drive signal proportional to a turns ratio of the pulse transformer is generated in a secondary winding of the pulse transformer. This causes a positive drive signal to be applied between a gate and a source of the MOSFET used for the main circuit, which serves as a semiconductor switch, to bring the MOSFET used for the main circuit into an ON state. When a negative drive signal is applied to the primary winding of the pulse transformer, an isolated negative drive signal proportional to the turns ratio of the pulse transformer is generated in the secondary winding of the pulse transformer. This brings the upstream MOSFET on the secondary side of the pulse transformer into the ON state. As a result, a gate voltage of the MOSFET used for the main circuit changes to 0 V, and the MOSFET of the main circuit is brought into the OFF state accordingly.

CITATION LIST

Patent Literature

PTL 1: Japanese Patent Laying-Open No. S62-11916

SUMMARY OF INVENTION

Technical Problem

In the gate drive circuit disclosed in PTL 1, however, the gate voltage applied to a gate terminal of the MOSFET used for the main circuit is 0 to VG [V]. This makes the MOSFET used for the main circuit to be prone to erroneous changes to the ON state due to noise caused by switching of a high-frequency large current.

In the gate drive circuit disclosed in PTL 1, a possible solution for preventing the erroneous changes to the ON state due to noise includes a method by which the secondary winding of the pulse transformer is directly connected to the gate terminal of the MOSFET used for the main circuit via a gate resistor with no accompanying circuit provided on the secondary side of the pulse transformer so as to allow positive and negative gate voltages±VG to be applied.

When the semiconductor switch is, for example, an SiC_MOSFET, the SiC_MOSFET, however, is low in negative gate withstand voltage, so that a gate drive circuit of a known pulse transformer type having a gate voltage value equally ranging from positive to negative is unable to drive the SiC_MOSFET with a negative bias being applied.

In order to drive the SiC_MOSFET with the negative-biased gate voltage lowered, it is necessary to isolate the MOSFET used for the main circuit from a control circuit with respect to the gate signal with a photocoupler or a digital isolator, and supply isolated gate power having a voltage value varying between positive and negative to each gate drive circuit. The gate drive circuit, however, becomes complicated, which makes downsizing difficult and leads to an increase in cost.

In the short circuit protection circuit disclosed in PTL 1, an overcurrent flows through the MOSFET used for the main circuit, and on-resistance RDS (ON) of the MOSFET used for the main circuit causes an increase in drain-source voltage VDS. This brings, while a Zener diode is in conduction, the MOSFET used for the main circuit into the OFF state to interrupt the overcurrent. When the overcurrent is interrupted to lower the drain-source voltage VDS, the MOSFET used for the main circuit is brought into conduction (ON) again. Therefore, unless the cause of the overcurrent is removed, the MOSFET used for the main circuit is repeatedly brought into the OFF state. This may cause a secondary failure such as increase in loss of the MOSFET used for the main circuit and a failure of the MOSFET due to heat generation.

Further, a Zener voltage varies in a manner that depends on a temperature characteristic of the Zener diode, and an overcurrent detection level varies accordingly. Even when the overcurrent detection level is set low in consideration of the temperature characteristic of the Zener diode, a short circuit safe operation area of the MOSFET may not be satisfied when a fluctuation range of the temperature characteristic of the Zener diode is large. In particular, when the SiC_MOSFET is used as a semiconductor switch, the short circuit safe operation area may not be satisfied.

The SiC_MOSFET is low in on-resistance RDS (ON), which is a value of resistance between the drain and the source when the SiC_MOSFET is in the ON state, and an increase in the drain-source voltage VDS due to an overcurrent is accordingly suppressed. This causes the short circuit protection circuit to malfunction due to external noise.

The SiC_MOSFET is low in on-resistance RDS (ON), and an amount of change (Mt) in the short circuit current flowing through the SiC_MOSFET is accordingly large. Therefore, in the short circuit protection circuit disclosed in PTL 1, a counter electromotive voltage generated due to parasitic inductance when the SiC_MOSFET is brought into the OFF state exceeds the drain-source withstand voltage of the SiC_MOSFET, which may cause the SiC_MOSFET to fail.

It is therefore an object of the present disclosure to provide a gate drive circuit of a pulse transformer type and a power conversion device that can drive a semiconductor element having a rated value of a gate withstand voltage unequally ranging from positive to negative and can protect the semiconductor element against short circuits by safely interrupting an overcurrent flowing through the semiconductor element.

Solution to Problem

A gate drive circuit according to the present disclosure includes a pulse transformer, a first drive circuit connected to a first end of a primary winding of the pulse transformer, a second drive circuit connected to a second end of the primary winding of the pulse transformer, a voltage clamp unit that clamps a voltage of a semiconductor element at a specified voltage when a voltage output from a secondary winding of the pulse transformer is negative, a current detection circuit that detects current flowing through the semiconductor element to output a detection signal indicating a magnitude of the current, a control circuit that controls the first drive circuit and the second drive circuit based on the detection signal, and a current limiting circuit that imposes a limit on current flowing through the primary winding of the pulse transformer based on the detection signal.

A power conversion device according to the present disclosure includes a semiconductor module including a plurality of semiconductor elements, a plurality of the gate drive circuits each driving a corresponding one of semiconductor elements in the semiconductor module, and a control circuit that controls the plurality of gate drive circuits.

Advantageous Effects of Invention

According to the present invention, it is possible to drive a semiconductor element having a rated value of a gate withstand voltage unequally ranging from positive to negative and to safely interrupt an overcurrent flowing through the semiconductor element to protect the semiconductor elements against short circuits.

DESCRIPTION OF EMBODIMENTS

Hereinafter, embodiments will be described with reference to the drawings.

First Embodiment

Figure 1:
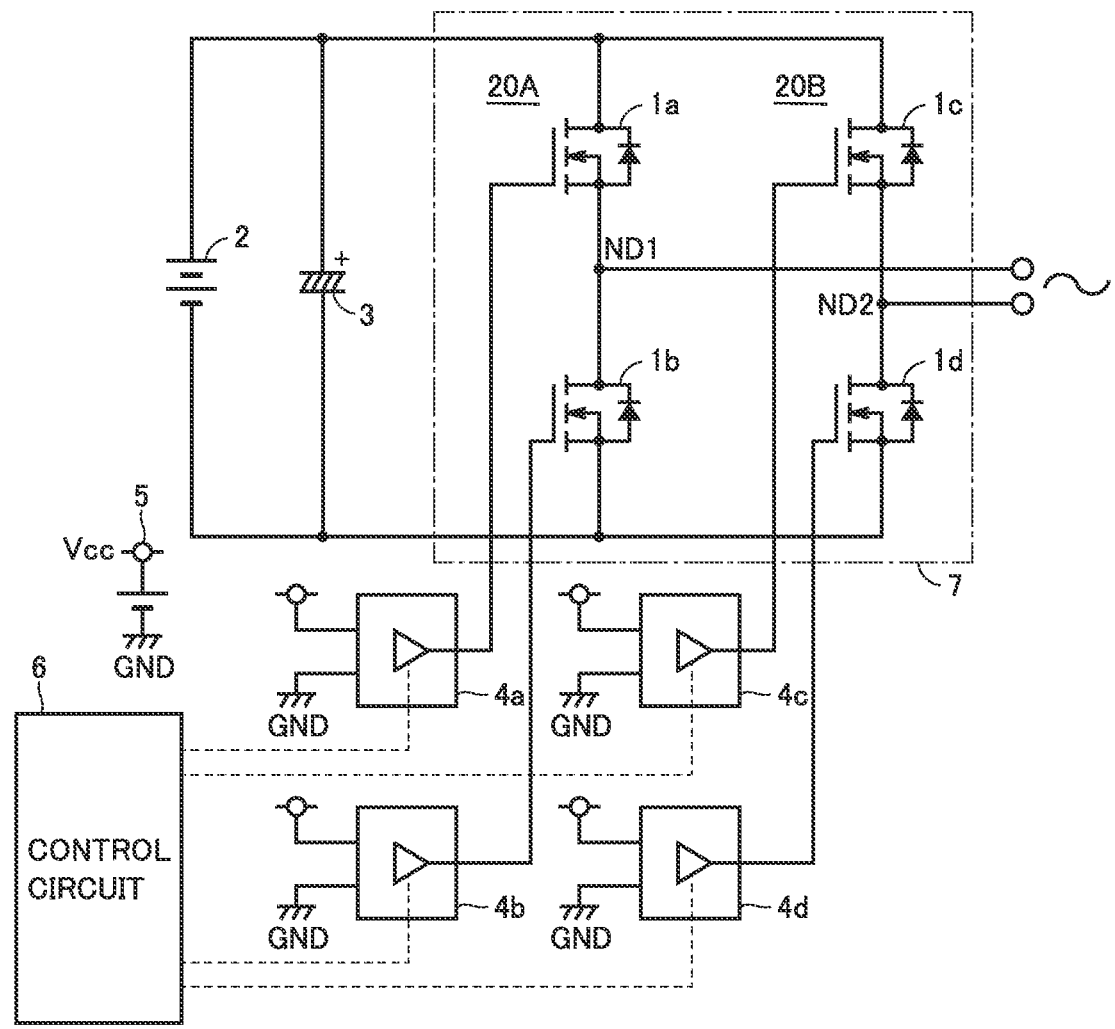
FIG. 1 is a diagram illustrating a configuration of a power conversion device according to an embodiment.

FIG. 1 is a diagram illustrating a configuration of a power conversion device according to an embodiment.

This power conversion device is an inverter circuit that converts a DC voltage into a single-phase high-frequency AC voltage. The power conversion device includes a semiconductor module 7, a DC power supply 2, a smoothing capacitor 3, gate drive circuits 4a to 4d, a gate power supply 5, and a control circuit 6.

DC power supply 2 supplies a DC voltage.

Smoothing capacitor 3 makes the DC voltage steady.

Semiconductor module 7 includes a full bridge inverter circuit.

Semiconductor module 7 includes a circuit block 20A and a circuit block 20B. Circuit block 20A includes a semiconductor element 1a of an upper arm and a semiconductor element 1b of a lower arm. Circuit block 20B includes a semiconductor element 1c of the upper arm and a semiconductor element 1d of the lower arm. In the following description, semiconductor elements 1a to 1d may be collectively referred to as a semiconductor element 1.

Each of four semiconductor elements 1a, 1b, 1c, 1d is an N-channel metal-oxide-semiconductor-field-effect-transistor (MOSFET). The four N-channel MOSFETs are, for example, silicon carbide (SiC) MOSFETs. Alternatively, the four N-channel MOSFETs may be MOSFETs or IGBTs made of Si.

Drain terminals of semiconductor elements 1a, 1c of the upper arm are connected to a positive terminal of DC power supply 2 and one end of smoothing capacitor 3. Source terminals of semiconductor elements 1a, 1c of the upper arm are connected to drain terminals of semiconductor elements 1b, 1d of the lower arm. Source terminals of semiconductor elements 1b, 1d of the lower arm are connected to a negative terminal of DC power supply 2 and the other end of smoothing capacitor 3.

DC power supply 2, smoothing capacitor 3, semiconductor elements 1a, 1b connected in series, and semiconductor elements 1c, 1d connected in series are connected in parallel.

A high-frequency AC voltage is output from a node ND1 located between the source terminal of semiconductor element 1a and the drain terminal of semiconductor element 1b and a node ND2 located between the source terminal of semiconductor element 1c and the drain terminal of semiconductor element 1d.

Gate drive circuits 4a, 4b, 4c, 4d drive semiconductor elements 1a, 1b, 1c, 1d, respectively. In the following description, gate drive circuits 4a, 4b, 4c, 4d may be collectively referred to as a gate drive circuit 4.

Gate power supply 5 supplies power to gate drive circuits 4a, 4b, 4c, 4d.

Control circuit 6 controls gate drive circuits 4a, 4b, 4c, 4d in accordance with a switching signal.

Figure 2:
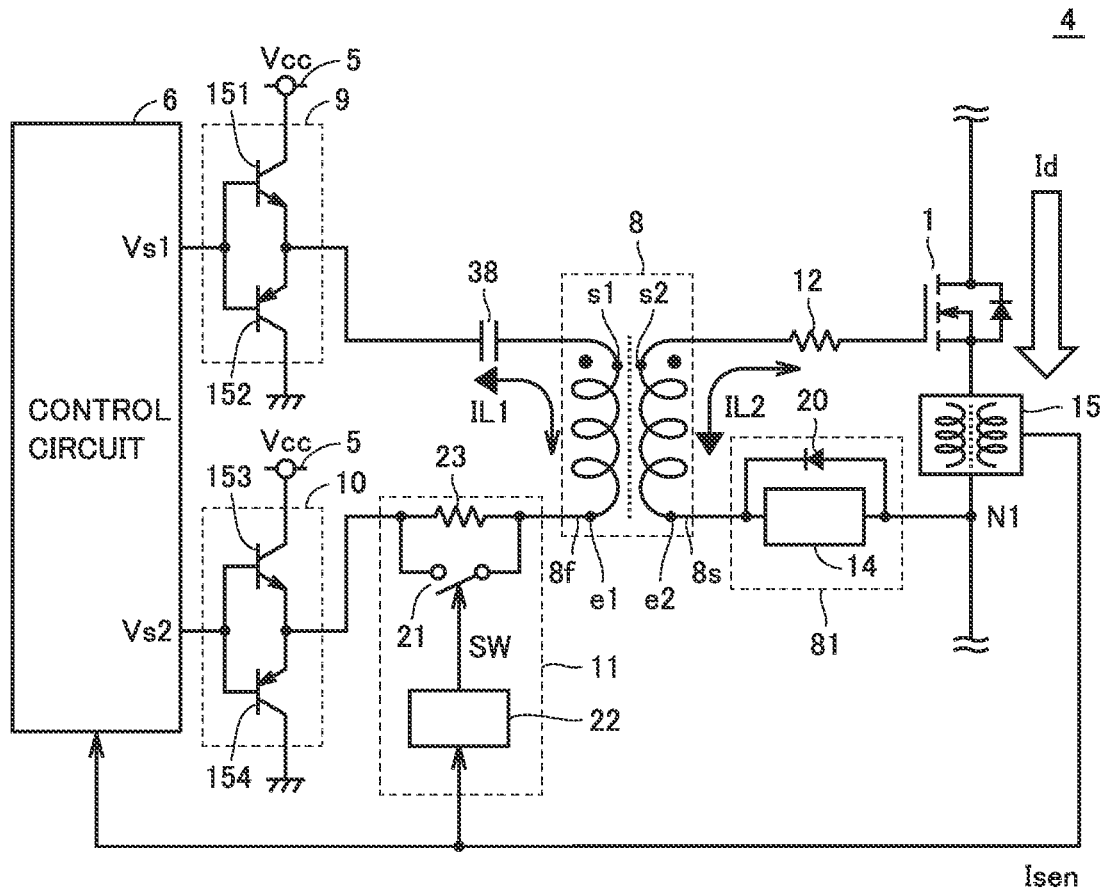
FIG. 2 is a diagram illustrating a configuration of a gate drive circuit 4 according to a first embodiment.

FIG. 2 is a diagram illustrating a configuration of gate drive circuit 4 according to the first embodiment.

Gate drive circuit 4 includes a pulse transformer 8, a current limiting circuit 11, a first drive circuit 9, a second drive circuit 10, a capacitor 38, a gate resistor 12, semiconductor element 1, a voltage clamp unit 81, and a current detection circuit 15. Voltage clamp unit 81 includes a clamp circuit 14 and a bypass diode 20. Gate drive circuit 4 is an isolated gate drive circuit using pulse transformer 8.

Pulse transformer 8 includes at least one primary winding 8f and at least one secondary winding 8s. Primary winding 8f and secondary winding 8s are electrically isolated from each other. The number of turns of primary winding 8f is denoted by n1. The number of turns of secondary winding 8s is denoted by n2.

First drive circuit 9 is connected to a winding start s1 (first end) of primary winding 8f. Second drive circuit 10 is connected to a winding end e1 (second end) of primary winding 8f.

First drive circuit 9 is an inverter including an NPN transistor 151 and a PNP transistor 152 connected in series between gate power supply 5 and the ground. Second drive circuit 10 is an inverter including an NPN transistor 153 and a PNP transistor 154 connected in series between gate power supply 5 and the ground. First drive circuit 9 and second drive circuit 10 receive power supplied from gate power supply 5.

Control circuit 6 issues a first switching signal Vs1 to an input of first drive circuit 9. Control circuit 6 issues a second switching signal Vs2 to an input of second drive circuit 10.

First drive circuit 9 supplies current to pulse transformer 8 in accordance with first switching signal Vs1 issued from control circuit 6. Second drive circuit 10 supplies current to pulse transformer 8 in accordance with second switching signal Vs2 issued from control circuit 6.

Current limiting circuit 11 includes a current limiting resistor 23 and a switch 21 connected in parallel. Current limiting circuit 11 further includes a control unit 22 that sets switch 21 to an ON or position. Current limiting resistor 23 and switch 21 connected in parallel are arranged in wiring extending between winding end e1 of primary winding 8f of pulse transformer 8 and second drive circuit 10. Current limiting circuit 11 imposes a limit on current flowing through primary winding 8f of pulse transformer 8 in accordance with a current detection signal Isen. Specifically, according to the embodiment, current limiting circuit 11 imposes a limit on the current flowing through primary winding 8f of pulse transformer 8 by imposing a limit on current flowing between winding end e1 of primary winding 8f of pulse transformer 8 and second drive circuit 10 in accordance with current detection signal Isen.

Capacitor 38 is disposed in wiring extending between winding start s1 of primary winding 8f of pulse transformer 8 and first drive circuit 9.

Gate resistor 12 has one end connected to winding start s2 of secondary winding 8s of pulse transformer 8. Gate resistor 12 has the other end connected to a gate terminal of semiconductor element 1.

Clamp circuit 14 and bypass diode 20 connected in parallel are arranged in wiring extending between winding end e2 of secondary winding 8s of pulse transformer 8 and node N1.

Current detection circuit 15 is connected between the source terminal of semiconductor element 1 and node N1. Current detection circuit 15 detects a magnitude of current flowing between the source terminal of semiconductor element 1 and node N1, and outputs current detection signal Isen indicating the magnitude of the current thus detected.

Current detection signal Isen output from current detection circuit 15 is input to control unit 22 of current limiting circuit 11 and control circuit 6. In gate drive circuit 4 according to the first embodiment, a direct current transformer (DCCT) is used as current detection circuit 15. Control circuit 6 controls first drive circuit 9 and second drive circuit 10.

Voltage clamp unit 81 clamps a voltage of semiconductor element 1 at a specified voltage when a voltage output from secondary winding 8s of pulse transformer 8 is negative.

Figure 3:
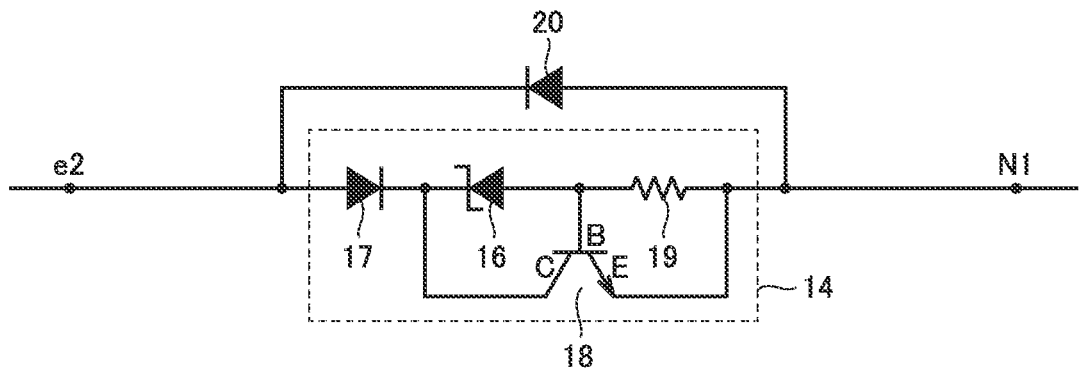
FIG. 3 is a diagram illustrating details of a clamp circuit 14.

FIG. 3 is a diagram illustrating details of clamp circuit 14.

Clamp circuit 14 and bypass diode 20 are connected between winding end e2 of secondary winding 8s of pulse transformer 8 and node N1.

Clamp circuit 14 includes a Zener diode 16, a diode 17, an NPN transistor 18, and a resistor 19.

Zener diode 16 has an anode terminal connected to one end of resistor 19 and a base terminal of NPN transistor 18. Resistor 19 has the other end connected to node N1.

NPN transistor 18 has a collector terminal connected to a cathode terminal of Zener diode 16. NPN transistor 18 has an emitter terminal connected to node N1.

Diode 17 has a cathode terminal connected to the cathode terminal of Zener diode 16. Diode 17 has an anode terminal connected to winding end e2 of secondary winding 8s of pulse transformer 8.

Bypass diode 20 has a cathode terminal connected to winding end e2 of secondary winding 8s of pulse transformer 8. Bypass diode 20 has an anode terminal connected to node N1.

With reference to FIG. 2 again, switch 21 of current limiting circuit 11 is in the ON position during the normal state. When the magnitude of isolated current detection signal Isen output from current detection circuit 15 exceeds a threshold Vth, control unit 22 set a switch signal SW at a low level to bring switch 21 into the OFF position. It is required that switch 21 connected in parallel with current limiting resistor 23 makes a response faster than a short circuit withstand time of the MOSFET that is typically less than or equal to several μs. Therefore, a MOSFET capable of high-speed switching is used as switch 21 rather than a mechanical relay.

Figure 4:
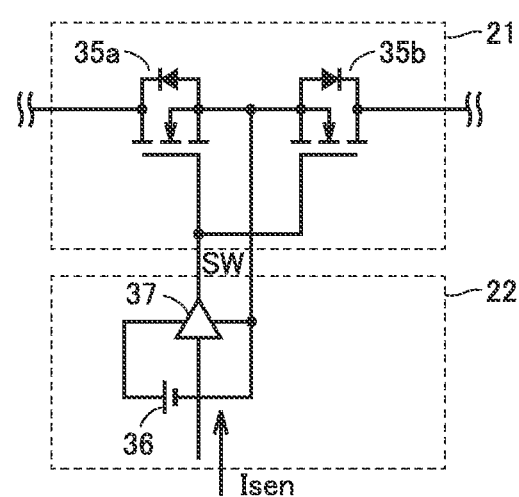
FIG. 4 is a diagram illustrating a configuration of a switch 21 and a configuration of a control unit 22.

FIG. 4 is a diagram illustrating a configuration of switch 21 and a configuration of control unit 22.

Switch 21 includes N-channel MOSFETs 35a, 35b. Control unit 22 includes an isolated power supply 36 and a gate drive circuit 37.

A drive current IL1 flows through switch 21 in both directions. The MOSFET has a parasitic body diode, so that two N-channel MOSFETs 35a, 35b are provided to switch the current flowing in both directions. N-channel MOSFET 35 has a source terminal connected to a source terminal of N-channel MOSFET 35b.

In order to drive two N-channel MOSFETs 35a, 35b, it is necessary to apply a gate voltage higher than a gate threshold to gate terminals of two N-channel MOSFETs 35a, 35b with respect to the source terminals. The source terminals of two N-channel MOSFETs 35a, 35b are isolated from GND, so that isolated power supply 36 using the source terminals of two N-channel MOSFETs 35a, 35b as a reference potential is exclusively provided.

Gate drive circuit 37 drives N-channel MOSFETs 35a, 35b when the magnitude indicated by current detection signal Isen is greater than or equal to threshold Vth.

Figure 5:
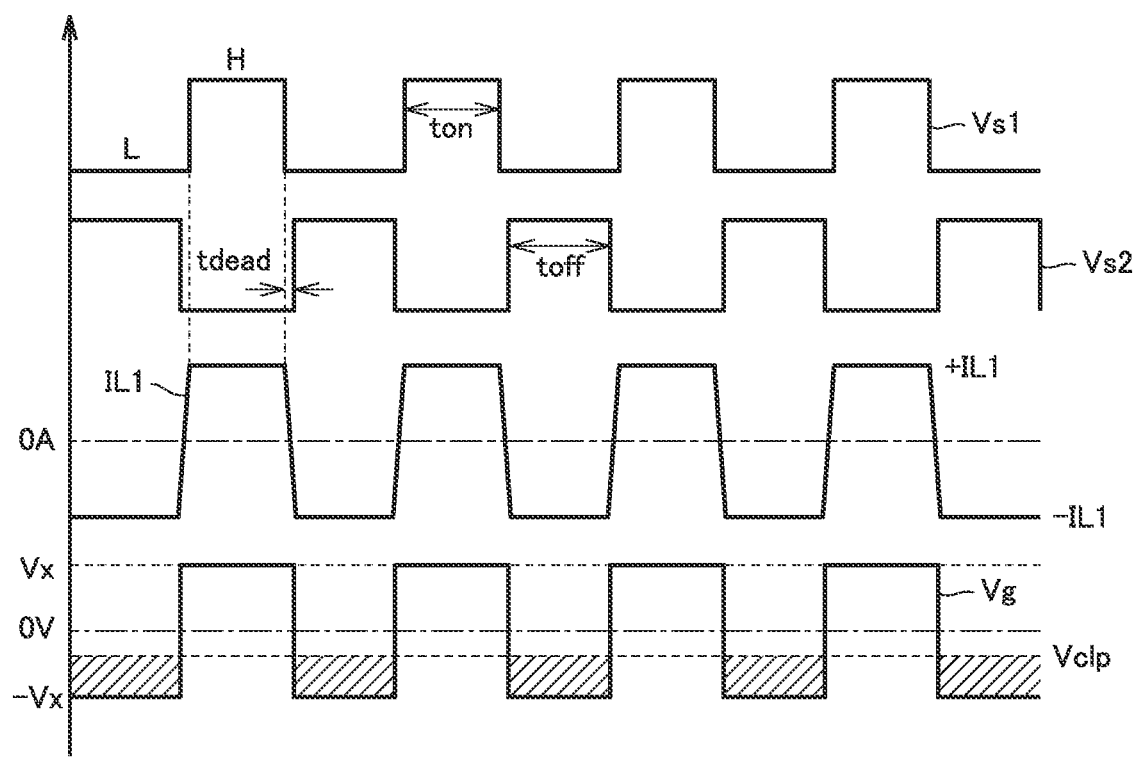
FIG. 5 is a timing chart of the gate drive circuit according to the first embodiment.

FIG. 5 is a timing chart of the gate drive circuit according to the first embodiment.

Control circuit 6 outputs first switching signal Vs1 to first drive circuit 9. Control circuit 6 outputs second switching signal Vs2 to second drive circuit 10. Vs1 and Vs2 are complementary to each other. That is, first switching signal Vs1 is shifted in phase by 180 degrees from second switching signal Vs2. Note that a dead time tdead is provided so as to prevent first switching signal Vs1 and second switching signal Vs2 from being at the ON level at the same time when their respective logic levels of first switching signal Vs1 and the logic of second switching signal Vs2 are inverted.

When first switching signal Vs1 is at the ON level and second switching signal Vs2 is at the OFF level, drive current IL1 of pulse transformer 8 flows from first drive circuit 9 connected to winding start s1 of primary winding 8f of pulse transformer 8 to second drive circuit 10 connected to winding end e1 of primary winding 8f of pulse transformer 8.

When first switching signal Vs1 is at the OFF level and second switching signal Vs2 is at the ON level, drive current IL1 of the pulse transformer flows from second drive circuit 10 connected to winding end e1 of primary winding 8f of pulse transformer 8 to first drive circuit 9 connected to winding start s1 of primary winding 8f of pulse transformer 8.

Capacitor 38 disposed between winding start s1 of primary winding 8f of pulse transformer 8 and first drive circuit 9 is a capacitor provided for preventing pulse transformer 8 from being unevenly magnetized.

For example, first switching signal Vs1 input to first drive circuit 9 and second switching signal Vs2 input to second drive circuit 10 become unstable at the startup of the power conversion device, during shutdown of the power conversion device, at the rise of gate power supply 5, at the fall of gate power supply 5, or when control circuit 6 malfunctions due to noise. When a time ton during which first switching signal Vs1 is at the high level and a time toff during which second switching signal Vs2 is at the high level are unbalanced, the magnitude of drive current IL1 is not equal between positive and negative. This makes the amount of change in magnetic flux through a core member of pulse transformer 8 unbalanced between positive and negative, thereby causing uneven magnetization.

When a difference between the amount of change in magnetic flux between positive and negative is accumulated and exceeds a saturation magnetic flux density of the core member of pulse transformer 8, an inductance value of primary winding 8f side of pulse transformer 8 rapidly decreases, and pulse transformer 8 is short-circuited. Driving pulse transformer 8 via capacitor 38 can make the magnitude of drive current IL1 equal between positive and negative. This makes it possible to prevent pulse transformer 8 from being unevenly magnetized.

According to the present embodiment, capacitor 38 is disposed between winding start s1 of primary winding 8f of pulse transformer 8 and first drive circuit 9, but even when capacitor 38 is disposed between winding end e1 of primary winding 8f of pulse transformer 8 and second drive circuit 10, the same effect can be obtained.

A voltage at winding start s1 of primary winding 8f of the pulse transformer is denoted by VL1.

When first switching signal Vs1 is at the ON level and second switching signal Vs2 is at the OFF level, the following positive voltage +VL2 is generated at winding start s2 of secondary winding 8s of pulse transformer 8.

$$+VL2=VL1*(n2/n1) \quad (1)$$

+VL2 is applied to the gate terminal of semiconductor element 1 via gate resistor 12. This brings bypass diode 20 into conduction. This forms a closed circuit with a path from winding start s2 of secondary winding 8s of pulse transformer 8 to winding end e2 of pulse transformer 8 through gate resistor 12, semiconductor element 1, and clamp circuit 14.

When first switching signal Vs1 is at the OFF level and second switching signal Vs2 is at the ON level, the following negative voltage −VL2 is generated at winding start s2 of secondary winding 8s of pulse transformer 8.

$$-VL2=-VL1*(n2/n1) \quad (2)$$

When negative voltage −VL2 is generated at winding start s2 of secondary winding 8s of pulse transformer 8, a closed circuit is formed with a path from winding end e2 of secondary winding 8s of pulse transformer 8 to winding start s2 of pulse transformer 8 through clamp circuit 14, semiconductor element 1, and gate resistor 12.

In clamp circuit 14, diode 17 is brought into conduction. A voltage Vb of the base terminal of NPN transistor 18 is expressed by the following equation using a forward voltage Vf of diode 17 and a Zener voltage Vz of Zener diode 16.

$$Vb=VL2-Vf-Vz \quad (3)$$

An emitter voltage Ve of NPN transistor 18 is a value obtained by subtracting a base-emitter voltage Vbe of NPN transistor 18 from base voltage Vb. A clamp voltage Vclp is equal to emitter voltage Ve of NPN transistor 18.

$$Vclp=VL2-Vf-Vz-Vbe \quad (4)$$

As illustrated in the timing chart of FIG. 5, when a gate voltage Vg of semiconductor element 1 is a negative voltage, gate voltage Vg is clamped at clamp voltage Vclp output from clamp circuit 14. That is, as illustrated in FIG. 5, when gate voltage Vg of semiconductor element 1 is at the high level, gate voltage Vg becomes a first value Vx. When gate voltage Vg of semiconductor element 1 is at low level, gate voltage Vg becomes a specified voltage (Vclp). Specified voltage Vclp is smaller in magnitude (absolute value) than first value Vx.

The magnitude of clamp voltage Vclp can be set freely by changing the magnitude of Zener voltage Vz of Zener diode 16. The gate drive circuit according to the first embodiment can drive, as semiconductor element 1, a semiconductor element having a rated value of a gate voltage unequally ranging from positive to negative such as an SiC_MOSFET with the rated gate voltage.

When gate voltage Vg is a negative voltage, gate voltage Vg is clamped at clamp voltage (specified voltage) Vclp output from clamp circuit 14. This allows semiconductor element 1 to change to the OFF state more gradually when the short circuit current is interrupted, so that it is possible to suppress the occurrence of a surge voltage Vsurge across the drain and source of semiconductor element 1.

In a gate drive circuit of a typical pulse transformer type as disclosed in PTL 1, the gate voltage changes from 0 to Vg, so that it is possible to drive a semiconductor element having a rated value of a gate withstand voltage unequally ranging from positive to negative such as an SiC_MOSFET. The gate voltage, however, cannot be negative-biased, so that when a high-frequency large current is switched, noise may be superimposed on the gate voltage to cause the gate voltage to erroneously change to the ON level.

With no accompanying circuit provided on the secondary side of the pulse transformer of the gate drive circuit disclosed in PTL 1, directly connecting the secondary winding of the pulse transformer to the gate terminal of the MOSFET of the main circuit via the gate resistor allows positive or negative gate voltage Vg to be applied. In the SiC_MOSFET having a rated value of a gate voltage unequally ranging from positive to negative, gate voltage Vg, however, may exceed the gate withstand voltage to cause the SiC_MOSFET to fail.

When an output terminal of the full bridge inverter circuit is short-circuited due to an accident, or external noise is superimposed on the gate signal applied to the MOSFET to cause a malfunction, a short circuit current or an overcurrent flows through the MOSFET. According to the present embodiment, it is possible to work around such problems.

Figure 6:
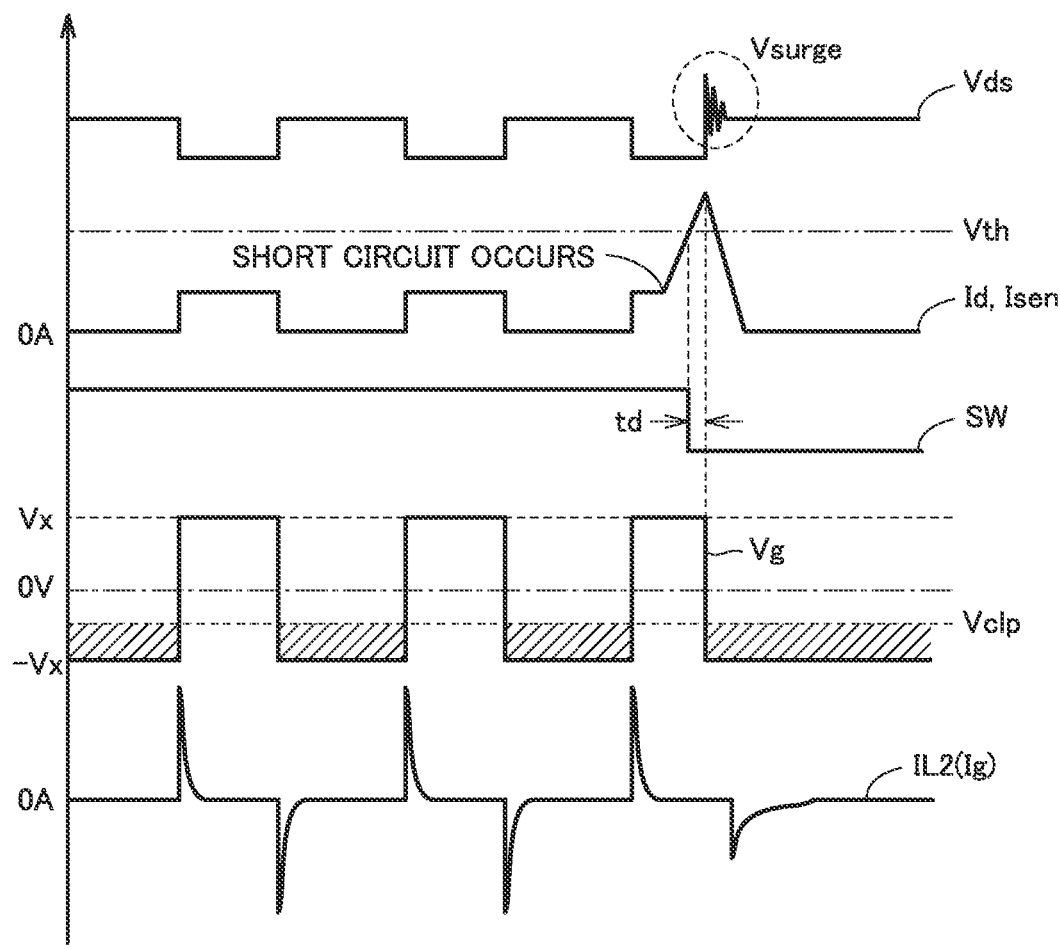
FIG. 6 is a timing chart of the gate drive circuit when a short circuit occurs according to the first embodiment and a second embodiment.

FIG. 6 is a timing chart of the gate drive circuit when a short circuit occurs according to the first embodiment and a second embodiment.

When an overcurrent flows through semiconductor element 1, and the magnitude of current detection signal Isen output from current detection circuit 15 exceeds threshold Vth, control unit 22 sets switch signal SW at the low level to bring switch 21 into the OFF position. This causes current limiting resistor 23 to connect to winding end e1 of primary winding 8f of pulse transformer 8 to impose a limit on drive current IL1 flowing through primary winding 8f of pulse transformer 8. Accordingly, a limit is also imposed on drive current IL2 output from secondary winding 8s of pulse transformer 8, which is a state equivalent to a state where gate resistor 12 is increased in resistance.

After a lapse of a certain time td, control circuit 6 inverts first switching signal Vs1 from the high level to the low level and inverts second switching signal Vs2 from the low level to the high level. At the same time, gate voltage Vg on the secondary side of pulse transformer 8 changes from the high level to the low level, but current limiting resistor 23 imposes a limit on current Ig (IL2) output from secondary winding 8s of pulse transformer 8 to cause semiconductor element 1 to gradually change to the OFF state, so that it is possible to suppress the generation of surge voltage Vsurge across the drain and source of semiconductor element 1.

The SiC_MOSFET is low in on-resistance, so that a current change dI/dt becomes large when a short circuit current flows. Further, the SiC_MOSFET is smaller in chip size per unit current than the Si MOSFET, so that the SiC_MOSFET is lower in short circuit safe operation area. Therefore, when the SiC_MOSFET is used as semiconductor element 1, it is necessary to interrupt a short circuit current more rapidly than when the Si MOSFET is used.

When the gate signal applied to the SiC_MOSFET is rapidly changed from the high level to the low level to interrupt a short circuit current upon detection of the short circuit current, surge voltage Vsurge is generated due to the parasitic inductance of wiring connected to the drain terminal and source terminal of the SiC_MOSFET and the pattern of a printed circuit board.

When the inductance value is denoted by LS, the passage time of the short circuit current is denoted by TS, and the short circuit current value at the time of interruption is denoted by IS, surge voltage Vsurge is expressed by the following formula.

$$V\text{surge}=(LS*IS)/TS \quad (5)$$

The short circuit protection circuit disclosed in PTL 1 cannot gradually interrupt a short circuit current, and surge voltage Vsurge becomes accordingly high, so that it is likely to exceed the rated value of the drain-source voltage of the SiC_MOSFET to cause a failure.

The short circuit protection circuit of the gate drive circuit according to the first embodiment sets semiconductor element 1 to the OFF state after current limiting resistor 23 imposes a limit on drive current IL1 flowing through primary winding 8f of pulse transformer 8. This causes drive current IL2 flowing through secondary winding 8s of pulse transformer 8 to be limited in the same manner as when gate resistor 12 is increased in resistance. This in turn causes semiconductor element 1 to gradually change to the OFF state, so that it is possible to prevent the occurrence of surge voltage Vsurge.

As described above, the gate drive circuit according to the present embodiment includes current limiting circuit 11 on the low-voltage circuit side of primary winding 8f of pulse transformer 8 isolated from the high voltage by pulse transformer 8. This makes it possible to suppress the occurrence of a malfunction in the current limiting circuit due to noise. It is further possible to reduce the number of circuit components on secondary winding 8s side of pulse transformer 8. It is further possible to design the main circuit wiring connected to the MOSFET of the main circuit to have a wider pattern width. This in turn makes it possible to reduce the parasitic inductance of the main circuit wiring through which a large current flows, so that it is possible to suppress the occurrence of the surge voltage when a short circuit current is interrupted and reduce the risk of causing the MOSFET to fail due to surge voltage Vsurge.

Second Embodiment

Figure 7:
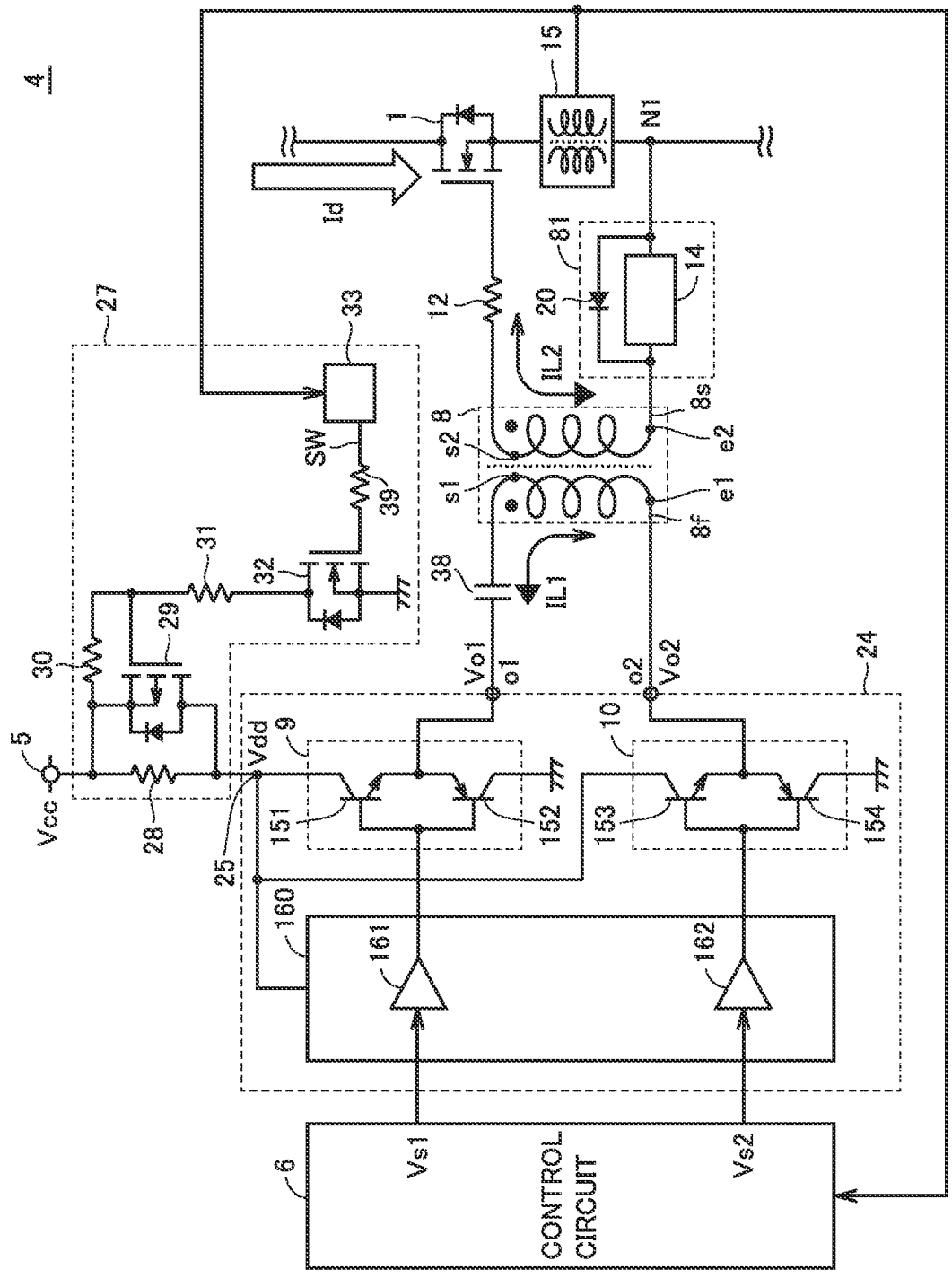
FIG. 7 is a diagram illustrating a configuration of the gate drive circuit 4 according to the second embodiment.

FIG. 7 is a diagram illustrating a configuration of a gate drive circuit 4 according to the second embodiment. Gate drive circuit 4 according to the second embodiment is different from gate drive circuit 4 according to the first embodiment in the following points. Gate drive circuit 4 according to the second embodiment includes a current limiting circuit 27 instead of current limiting circuit 11. Gate drive circuit 4 according to the second embodiment includes a gate drive IC 24.

Gate drive IC 24 includes a level shifter 160, first drive circuit 9, second drive circuit 10, and output terminals o1, o2.

Level shifter 160 includes a buffer 161 and a buffer 162. Buffer 161 converts a level (0 to 3.3 or 5.0 V) of first switching signal Vs1 output from control circuit 6 into a drive voltage level (0 to Vcc), and outputs the drive voltage level to first drive circuit 9. Buffer 162 converts a level (0 to 3.3 or 5.0 V) of second switching signal Vs2 output from control circuit 6 into a drive voltage level (0 to Vcc), and outputs the drive voltage level to second drive circuit 10.

A level of a voltage Vo1 output from output terminal o1 is controlled in accordance with first switching signal Vs1 output from control circuit 6. A level of a voltage Vo2 output from output terminal o2 is controlled in accordance with second switching signal Vs2 output from control circuit 6.

Output terminal o1 of gate drive IC 24 is connected to winding start s1 of primary winding 8f of pulse transformer 8 via capacitor 38. Output terminal o2 of gate drive IC 24 is connected to winding end e1 of primary winding 8f of pulse transformer 8.

Current limiting circuit 27 imposes a limit on current ICC to be supplied to first drive circuit 9 and second drive circuit 10 based on the magnitude of current detection signal Isen.

Current limiting circuit 27 includes a current limiting resistor 28, a P-channel MOSFET 29 serving as a main switch, a resistor 30, a gate resistor 31, an N-channel MOSFET 32, a resistor 39, and a control unit 33.

Current limiting resistor 28 and P-channel MOSFET 29 are connected in parallel between a power supply node 25 of first drive circuit 9 and second drive circuit 10 and gate power supply 5.

P-channel MOSFET 29 has a source terminal connected to gate power supply 5. P-channel MOSFET 29 has a drain terminal connected to power supply node 25. Resistor 30 is connected between a gate terminal and the source terminal of P-channel MOSFET 29. P-channel MOSFET 29 has the gate terminal connected to one end of gate resistor 31.

Gate resistor 31 has the other end connected to a drain terminal of N-channel MOSFET 32. N-channel MOSFET 32 has a source terminal connected to GND. N-channel MOSFET 32 has a gate terminal connected to control unit 33 via resistor 39.

Current detection signal Isen output from current detection circuit 15 connected to the source terminal of semiconductor element 1 on the secondary side of pulse transformer 8 is input to control unit 33 of current limiting circuit 27 and control circuit 6.

When current detection signal Isen exceeds threshold Vth, control unit 33 sets N-channel MOSFET 32 to the OFF state. This brings P-channel MOSFET 29 serving as a main switch into the OFF state.

A description will be given below of how the short circuit protection circuit of the gate drive circuit operates when an overcurrent or a short circuit current flows through semiconductor element 1 of the main circuit on the secondary side of the pulse transformer with reference to FIG. 6 described in the first embodiment.

When the magnitude of current detection signal Isen exceeds threshold Vth due to a short circuit current, a switch signal SW output from control unit 33 of current limiting circuit 27 changes from the high level to the low level. This brings N-channel MOSFET 32 into the OFF state. Accordingly, a voltage across the gate and source terminals of P-channel MOSFET 29 becomes 0 V, and P-channel MOSFET 29 changes from the ON state to the OFF state. The change of P-channel MOSFET 29 to the OFF state makes only a path passing through current limiting resistor 28 usable as a path between power supply node 25 and gate power supply 5, and a supply current ICC to gate drive IC 24 is accordingly limited.

Current is supplied from power supply node 25 of gate drive IC 24 to first drive circuit 9 and second drive circuit 10, so that drive current IL1 supplied from output terminals o1, o2 of gate drive IC 24 to the primary winding of pulse transformer 8 is also limited by the limitation on supply current ICC. As a result, a gate current IG (IL2) supplied from secondary winding 8s of pulse transformer 8 to the gate terminal of semiconductor element 1 via gate resistor 12 is also limited in the same manner as when gate resistor 12 is increased in resistance.

With a delay of certain time td, control circuit 6 inverts first switching signal Vs1 from the high level to the low level and inverts second switching signal Vs2 from the low level to the high level. At the same time, gate voltage Vg on the secondary side of pulse transformer 8 changes from the high level to the low level, but the power supply to gate drive IC 24 is limited by current limiting resistor 28, and gate current Ig (IL2) on the secondary side of the pulse transformer is accordingly limited. This causes semiconductor element 1 to gradually change to the OFF state, so that it is possible to reduce surge voltage Vsurge across the drain and source of semiconductor element 1.

Switch 21 of current limiting circuit 11 of the gate drive circuit according to the first embodiment requires isolated power supply 36 that is exclusively provided as described above, thereby making the circuit scale of current limiting circuit 11 larger. This makes downsizing difficult and leads to an increase in cost.

On the other hand, in the gate drive circuit according to the present embodiment, one P-channel MOSFET 29 serves as the switch of current limiting circuit 27. This eliminates the need of an isolated gate power supply that is exclusively provided to change P-channel MOSFET 29 to the ON state or the OFF state. This makes the circuit scale of current limiting circuit 27 smaller, and the cost and size can be accordingly reduced.

Third Embodiment

Figure 8:
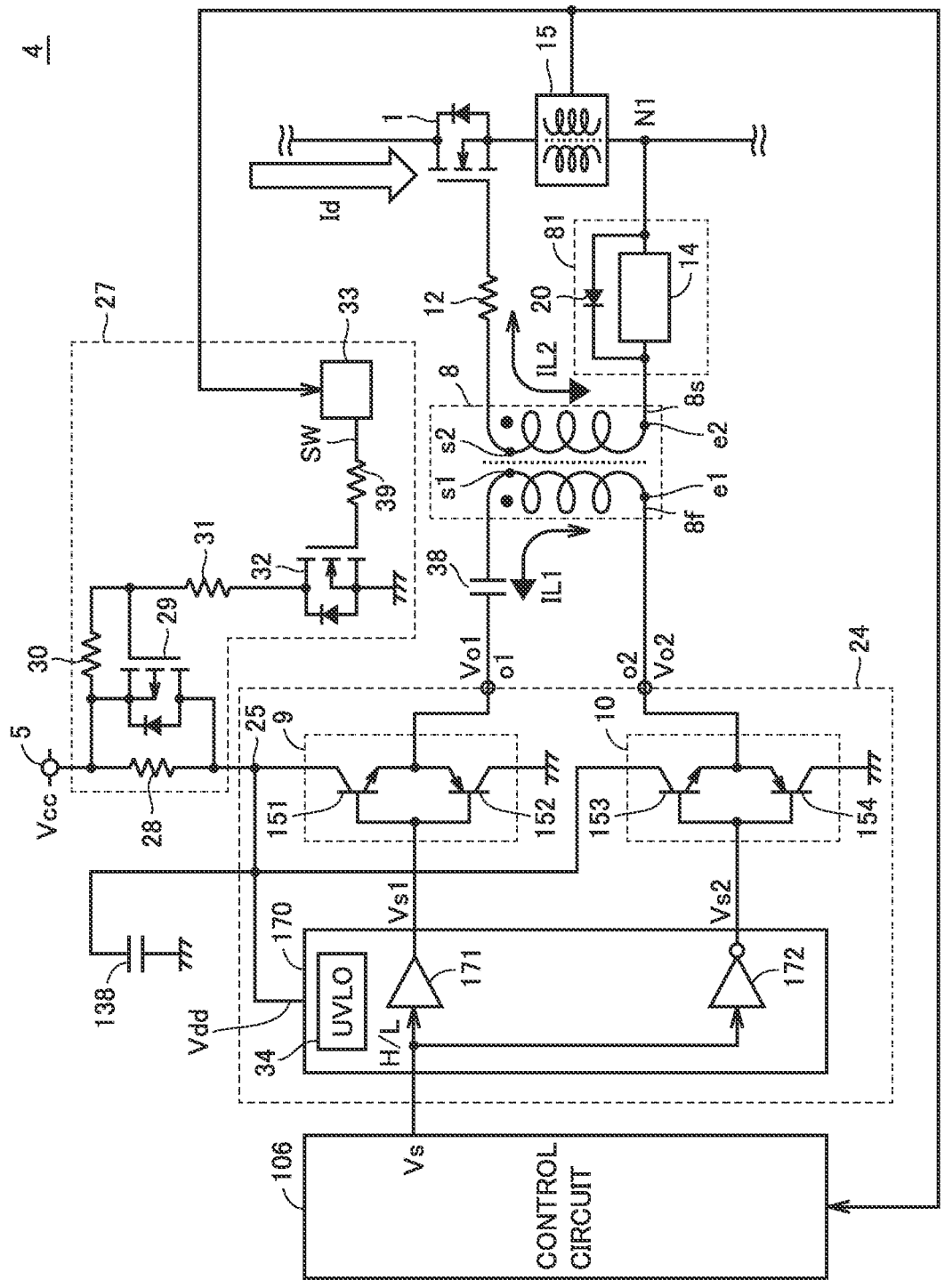
FIG. 8 is a diagram illustrating a configuration of the gate drive circuit 4 according to a third embodiment.

FIG. 8 is a diagram illustrating a configuration of a gate drive circuit 4 according to a third embodiment.

Gate drive circuit 4 according to the third embodiment is different from gate drive circuit 4 according to the second embodiment in the following points.

Gate drive circuit 4 according to the third embodiment includes a control circuit 106 instead of control circuit 6. Gate drive IC 24 of gate drive circuit 4 according to the third embodiment includes a level shifter 170 instead of level shifter 160.

Level shifter 170 includes a buffer 171, an inverter 172, and a voltage control circuit 34.

Buffer 171 converts a level (0 to 3.3 or 5.0 V) of a control signal Vs output from control circuit 106 into a drive voltage level (0 to Vcc), and outputs first switching signal Vs1 to first drive circuit 9. Inverter 172 inverts control signal Vs output from control circuit 6, converts a level (0 to 3.3 V or 5.0 V) of the signal thus inverted into a drive voltage level (0 to Vcc), and outputs second switching signal Vs2 to second drive circuit 10. Buffer 171 and inverter 172 operate so as to provide a dead time between first switching signal Vs1 output from buffer 171 and second switching signal Vs2 output from inverter 172.

Gate drive IC 24 is a ready-made gate drive IC with high functionality and has a low-voltage detection function. When detecting a decrease in or loss of gate power, voltage control circuit 34 fixes the output of gate drive IC 24 or sets the output at high impedance. This makes it possible to prevent the semiconductor element to be driven from erroneously changing to the ON state.

Voltage control circuit 34 detects a decrease in voltage Vdd of power supply node 25. When output voltage Vo1 of first drive circuit 9 is at the high level, and output voltage Vo2 of second drive circuit 10 is at the low level upon detection of a decrease in voltage Vdd of power supply node 25 to a specified value Vth_U, voltage control circuit 34 changes output voltage Vo1 of first drive circuit 9 to the low level and changes output voltage Vo2 of second drive circuit 10 to the high level. When output voltage Vo1 of first drive circuit 9 is at the low level, and output voltage Vo2 of second drive circuit 10 is at the high level upon detection of a decrease in voltage Vdd of power supply node 25 to specified value Vth_U, voltage control circuit 34 holds output voltage Vo1 of first drive circuit 9 at the low level and holds output voltage Vo2 of second drive circuit 10 at the high level.

For example, voltage control circuit 34 includes a comparator and a switch. The comparator compares voltage Vdd applied to power supply node 25 with specified value Vth_U. When Vdd≥Vth_U is satisfied, the switch causes control signal Vs output from control circuit 106 to connect to an input terminal in level shifter 170. When Vdd≤Vth_U is satisfied, the switch causes the input terminal in level shifter 170 to connect to the power supply voltage (3.3 V or 5.0 V). This allows the input to buffer 171 and the input to inverter 172 to change to the high level.

Current limiting circuit 27 according to the third embodiment is the same as current limiting circuit 27 described in the second embodiment except for control unit 33. When the magnitude of the current indicated by current detection signal Isen exceeds threshold Vth, control unit 33 keeps switch signal SW at the low level only for a specified time tsw.

Figure 9:
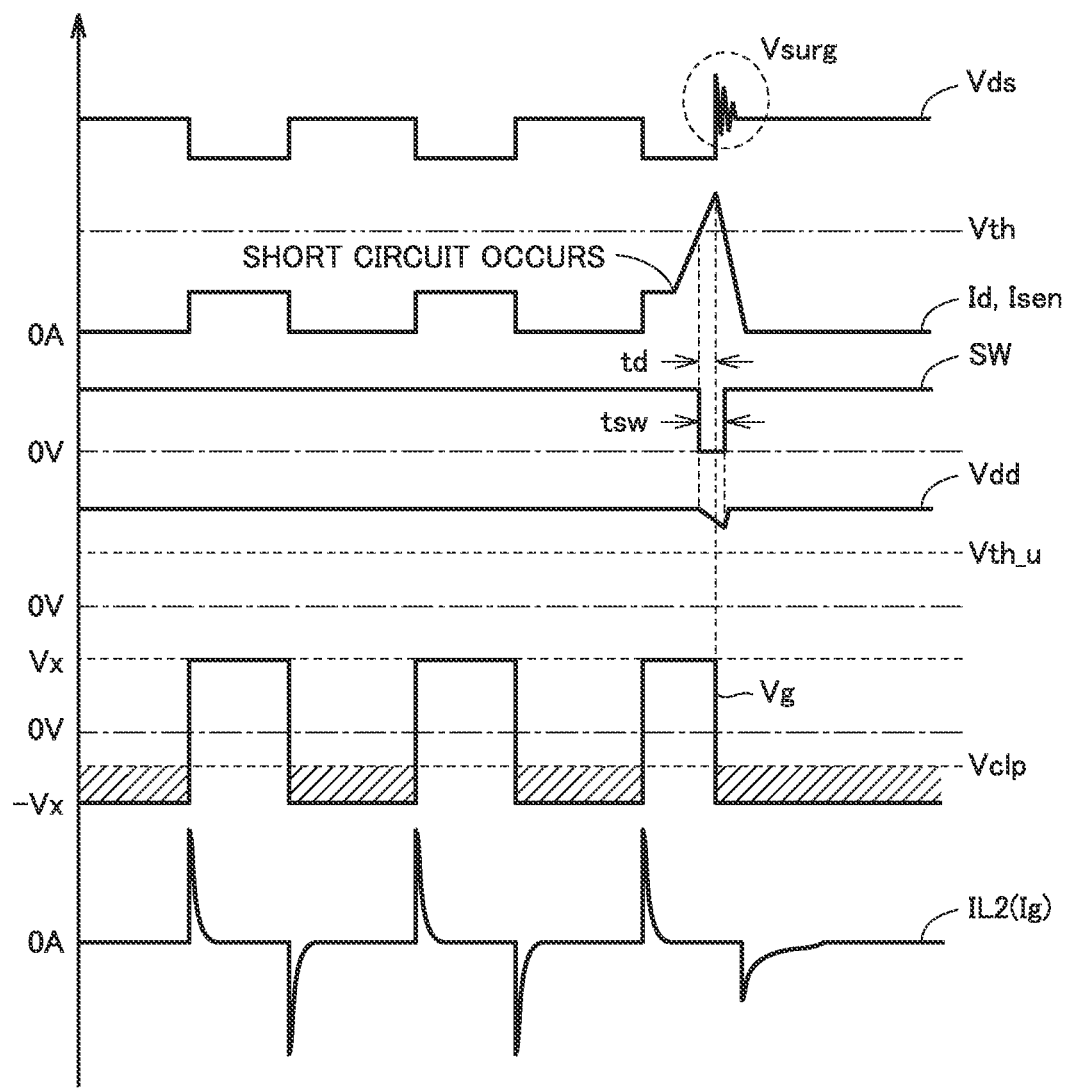
FIG. 9 is a timing chart when a short circuit current or an overcurrent flows through a semiconductor element 1 according to the third embodiment.

FIG. 9 is a timing chart when a short circuit current or an overcurrent flows through semiconductor element 1 according to the third embodiment.

When an arm short circuit occurs, an overcurrent flows through semiconductor element 1. When current detection signal Isen exceeds threshold Vth, control unit 33 of current limiting circuit 27 changes switch signal SW to the low level and keeps the low level only for specified time tsw. While switch signal SW is off, upstream N-channel MOSFET 32 of current limiting circuit 27 is in the OFF state. Accordingly, P-channel MOSFET 29 serving as a main switch is in the OFF state. This makes only a path passing through current limiting resistor 28 usable as a path between gate power supply 5 and power supply node 25.

This causes a decrease in voltage supplied to gate drive IC 24, but current is supplied from bypass capacitor 138 to prevent voltage Vdd of power supply node 25 of gate drive IC 24 from immediately decreasing, and voltage Vdd gradually decreases with a time constant τ determined by capacitance of bypass capacitor 138 and impedance of power supply node 25 of gate drive IC 24.

While switch signal SW output from control unit 33 of current limiting circuit 27 is off, current limiting resistor 28 causes voltage Vdd of power supply node 25 of gate drive IC 24 to continue to decrease. When voltage Vdd becomes less than or equal to specified value Vth_U, voltage control circuit 34 is brought into operation. Voltage control circuit 34 holds output voltage Vo1 of gate drive IC 24 at the low level and holds output voltage Vo2 at the high level.

When output voltage Vo1 is held at the low level and output voltage Vo2 is held at the high level, the current (−IL1) in the negative direction continues to flow through pulse transformer 8 to cause pulse transformer 8 to be unevenly magnetized and short-circuited. This causes an overcurrent to flow through gate drive IC 24 to cause gate drive IC 24 to fail.

Alternatively, when output voltage Vo1 is held at the low level and output voltage Vo2 is held at the high level to bring gate drive IC 24 out of operation, output terminals o1, o2 of gate drive IC 24 become high in impedance. As a result, a positive voltage is generated at winding start s2 of secondary winding 8s of pulse transformer 8 by the counter electromotive force due to the excitation energy of pulse transformer 8. This erroneously brings semiconductor element 1 into the ON state to cause a short circuit current flow, which may cause semiconductor element 1 to fail.

Therefore, according to the present embodiment, specified time tsw is set so as to prevent voltage Vdd of power supply node 25 from becoming less than or equal to specified value Vth_U after the lapse of specified time tsw. This causes P-channel MOSFET 29 to change to the ON state before voltage Vdd of power supply node 25 of gate drive IC 24 becomes less than or equal to specified value Vth_U. This makes it possible to prevent voltage control circuit 34 from being brought into operation.

Thereafter, control circuit 106 inverts the level of the control signal Vs before the lapse of specified time tsw so as to invert the level of the first switching signal Vs1 and the level of the second switching signal Vs2.

According to the present embodiment, it is possible to interrupt a short circuit current while imposing a limit on the gate current of semiconductor element 1 with voltage control circuit 34 out of operation. This allows a reduction in surge voltage Vsurge generated when the short-circuit current is interrupted, and allows the short circuit current to be safely interrupted without causing semiconductor element 1 to fail.

In the gate drive circuit according to the third embodiment, not only the gate drive IC having a low-voltage detection function can be used, but also a mounting space can be reduced as compared with a configuration in which the drive circuit and the level shifter are discrete components. Further, only control signal Vs is used as a control signal for controlling the gate drive IC, so that the number of control signals can be reduced by half as compared with the first and second embodiments. This allows a microcomputer or a field-programmable gate array (FPGA) having a small number of output ports to be used as the control circuit, for example.

It should be understood that the embodiments disclosed herein are illustrative in all respects and not restrictive. The scope of the present disclosure is defined by the claims rather than the above descriptions and is intended to include all modifications which will be made with the meanings of equivalents of the claims and within the scope of the claims.

REFERENCE SIGNS LIST 1, 1a, 1b, 1c, 1d: semiconductor element, 2: DC power supply, 3: smoothing capacitor, 4, 4a, 4b, 4c, 4d, 37: gate drive circuit, 5: gate power supply, 6, 106: control circuit, 7: semiconductor module, 8: pulse transformer, 8f: primary winding, 8s: secondary winding, 9: first drive circuit, 10: second drive circuit, 11, 27: current limiting circuit, 12, 31: gate resistor, 14: clamp circuit, 15: current detection circuit, 16: Zener diode, 17: diode, 18, 35a, 151, 152, 153, 154: transistor, 19, 30, 39: resistor, 20: bypass diode, 20A, 20B: circuit block, 21: switch, 22, 33: control unit, 23, 28: current limiting resistor, 24: gate drive IC, 25: power supply node, 29, 32, 35a, 35b: MOSFET, 34: voltage control circuit, 36: isolated power supply, 38: capacitor, 81: voltage clamp unit, 138: bypass capacitor, 160, 170: level shifter, 161, 162, 171: buffer, 172: inverter

The invention claimed is:

1. A gate drive circuit comprising:
a pulse transformer;
a first drive circuit connected to a first end of a primary winding of the pulse transformer;
a second drive circuit connected to a second end of the primary winding of the pulse transformer;
a voltage clamper to clamp a voltage of a semiconductor element at a specified voltage when a voltage output from a secondary winding of the pulse transformer is negative;
a current detection circuit to detect current flowing through the semiconductor element and output a detection signal indicating a magnitude of the current;
a control circuit to control the first drive circuit and the second drive circuit based on the detection signal; and
a current limiting circuit to impose a limit on current flowing through the primary winding of the pulse transformer based on the detection signal.

2. The gate drive circuit according to claim 1, wherein the voltage clamper clamps a gate voltage of the semiconductor element at the specified voltage when the gate voltage of the semiconductor element is negative.

3. The gate drive circuit according to claim 2, wherein when the gate voltage of the semiconductor element is at a high level, the gate voltage is equal to a first value,
when the gate voltage of the semiconductor element is at a low level, the gate voltage is equal to the specified voltage, and
the specified voltage is smaller in magnitude than the first value.

4. The gate drive circuit according to claim 1, wherein the secondary winding of the pulse transformer has a first end connected to a gate terminal of the semiconductor element via a gate resistor, the current detection circuit is disposed between a source terminal of the semiconductor element and a node, and the voltage clamper is disposed between a second end of the secondary winding of the pulse transformer and the node.

5. The gate drive circuit according to claim 4, wherein the voltage clamper includes a clamp circuit and a bypass diode connected in parallel.

6. The gate drive circuit according to claim 1, wherein the current limiting circuit imposes a limit on current flowing between the second end of the primary winding of the pulse transformer and the second drive circuit based on the detection signal.

7. The gate drive circuit according to claim 6, wherein the current limiting circuit includes a current limiting resistor and a switch connected in parallel between the second end of the primary winding of the pulse transformer and the second drive circuit, and a controller to set the switch to an OFF position when the magnitude of the current indicated by the detection signal exceeds a threshold.

8. The gate drive circuit according to claim 7, wherein the control circuit issues a first switching signal to an input of the first drive circuit and issues a second switching signal complementary to the first switching signal to an input of the second drive circuit, and the control circuit inverts a level of the first switching signal and a level of the second switching signal after a lapse of a certain time from when the switch is set to the OFF position.

9. The gate drive circuit according to claim 1, wherein the current limiting circuit imposes a limit on current to be supplied to the first drive circuit and the second drive circuit based on the detection signal.

10. The gate drive circuit according to claim 9, wherein the current limiting circuit includes a current limiting resistor and a P-channel MOSFET connected in parallel between a power supply node of the first drive circuit and the second drive circuit and a gate power supply, and a controller to set the P-channel MOSFET to an OFF state when the magnitude of the current indicated by the detection signal exceeds a threshold.

11. The gate drive circuit according to claim 10, wherein the current limiting circuit further includes an N-channel MOSFET disposed between the ground and a gate of the P-channel MOSFET, and the controller sets the N-channel MOSFET to an OFF state to bring the P-channel MOSFET into the OFF state when the magnitude of the current indicated by the detection signal exceeds the threshold.

12. The gate drive circuit according to claim 10 or 11, wherein the control circuit issues a first switching signal to an input of the first drive circuit and issues a second switching signal complementary to the first switching signal to an input of the second drive circuit, and the control circuit inverts a level of the first switching signal and a level of the second switching signal after a lapse of a certain time from when the P-channel MOSFET is set to the OFF state.

13. The gate drive circuit according to claim 10 or 11, further comprising a voltage control circuit to change an output voltage of the first drive circuit to a low level and change an output voltage of the second drive circuit to a high level when a voltage at the power supply node becomes less than or equal to a specified value, the output voltage of the first drive circuit is at the high level, and the output voltage of the second drive circuit is at the low level, wherein the controller keeps the P-channel MOSFET in the OFF state only for a specified time when the magnitude of the current indicated by the detection signal exceeds the threshold, and the specified time is set so as to prevent the voltage at the power supply node from becoming less than or equal to the specified value after a lapse of the specified time.

14. The gate drive circuit according to claim 13, further comprising a bypass capacitor connected to the power supply node.

15. The gate drive circuit according to claim 14, further comprising a drive IC, wherein the drive IC includes:
the first drive circuit;
the second drive circuit;
the voltage control circuit; and
a level shifter to issue a first switching signal to an input of the first drive circuit and issue a second switching signal complementary to the first switching signal to an input of the second drive circuit in accordance with a control signal output from the control circuit, and the control circuit inverts a level of the control signal before the lapse of the specified time to invert a level of the first switching signal and a level of the second switching signal.

16. The gate drive circuit according to claim 1, further comprising a capacitor disposed between the first end of the primary winding of the pulse transformer and the first drive circuit or between the second end of the primary winding of the pulse transformer and the second drive circuit.

17. A power conversion device comprising:
a semiconductor module including a plurality of semiconductor elements;
a plurality of gate drive circuits each to drive a corresponding one of the semiconductor elements in the semiconductor module; and
a control circuit to control the plurality of gate drive circuits, wherein
each of the gate drive circuits is the gate drive circuit according to claim 1.

* * * * *